M. G. DECROW.
Improvement in Churn-Dasher-Rods.
No. 120,046. Patented Oct. 17, 1871.
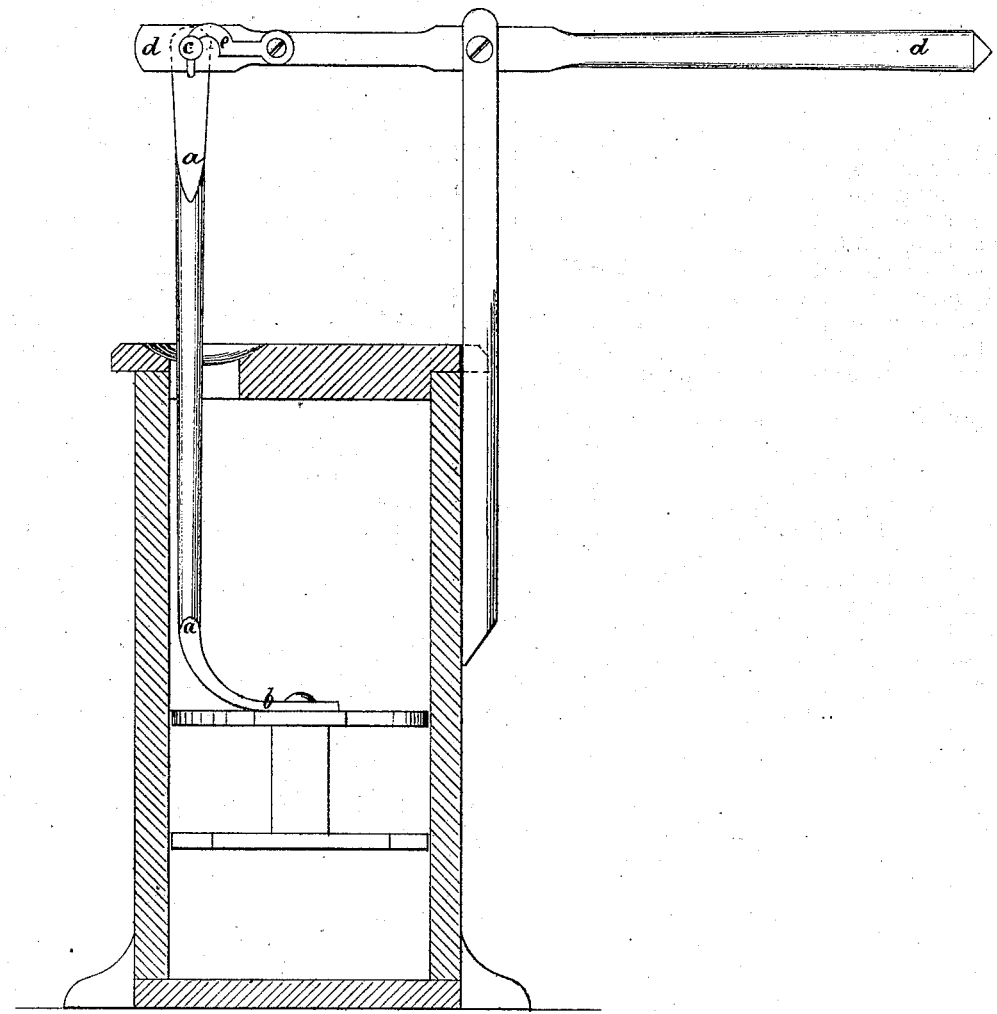

UNITED STATES PATENT OFFICE.

MARION G. DECROW, OF NEWARK, OHIO, ASSIGNOR OF ONE-HALF HIS RIGHT TO JOSEPH P. DECROW, JR., OF SAME PLACE.

IMPROVEMENT IN CHURN-DASHER RODS.

Specification forming part of Letters Patent No. 120,046, dated October 17, 1871.

*To all whom it may concern:*

Be it known that I, MARION G. DECROW, M. D., of Newark, in the county of Licking and State of Ohio, have invented a new and useful Improvement in Churns; and I do hereby declare that the following is a full, clear, and exact description thereof, which will enable others skilled in the art to make and use the same, reference being had to the accompanying drawing forming part of this specification, in which—

The figure is a side elevation of the lever, hook, rod, and dasher.

This invention relates to such construction of a dasher-rod, and the means for connecting the same with the operating lever, that when the churning is finished the butter may be conveniently taken out of the churn without removing the rod.

Referring to the drawing, $a$ is the rod aforesaid, the same being attached at its lower end to the dasher, and being immediately bent to one side so as to form an arm, $b$, at the lower end of the rod $a$, which arm is of such length that the rod, when in the churn, stands close to one side thereof, where it is entirely out of the way of the maid when removing butter from the churn. This flexure of the rod does not interfere in the least with its serviceableness. The rod $a$ is connected with the operating lever $d$ by means of a pin, $c$, passing through both the rod and lever. To one side of the lever $d$ a hook, $e$, is pivoted, which hook enters a hole in the pin $c$, when the latter is in position, the hook serving to hold the pin in place, and being easily removable when it is desired to separate the rod and lever.

Having thus described my invention, what I claim as new, and desire to secure by Letters Patent, is—

The combination of the rod $a$, lever $d$, pin $c$, and hook $e$, as specified.

MARION G. DECROW, M. D.

Witnesses:
GEO. W. INGRAHAM,
W. M. CUNNINGHAM.

(45)